(12) United States Patent
Kelly

(10) Patent No.: US 10,630,156 B2
(45) Date of Patent: Apr. 21, 2020

(54) GENERATOR

(71) Applicant: GREENSPUR RENEWABLES LIMITED, London (GB)

(72) Inventor: Hugh-Peter Granville Kelly, Westcliff on Sea (GB)

(73) Assignee: TIME TO ACT LIMITED, Hatfield, Hertfordshire (GB)

( * ) Notice: Subject to any disclaimer, the term of this patent is extended or adjusted under 35 U.S.C. 154(b) by 0 days.

(21) Appl. No.: 15/527,738

(22) PCT Filed: Nov. 20, 2015

(86) PCT No.: PCT/GB2015/053548
§ 371 (c)(1),
(2) Date: May 18, 2017

(87) PCT Pub. No.: WO2016/079537
PCT Pub. Date: May 26, 2016

(65) Prior Publication Data
US 2017/0358976 A1 Dec. 14, 2017

(30) Foreign Application Priority Data
Nov. 20, 2014 (GB) .................................. 1420641.1

(51) Int. Cl.
*H02K 3/28* (2006.01)
*H02K 21/24* (2006.01)
(Continued)

(52) U.S. Cl.
CPC .............. *H02K 21/24* (2013.01); *H02K 1/02* (2013.01); *H02K 1/2793* (2013.01); *H02K 3/28* (2013.01);
(Continued)

(58) Field of Classification Search
CPC .. H02K 1/00; H02K 1/06; H02K 3/00; H02K 3/04; H02K 3/28; H02K 3/47;
(Continued)

(56) References Cited

U.S. PATENT DOCUMENTS 3,407,320 A * 10/1968 McLean ................. H02K 5/132
310/114
3,992,641 A * 11/1976 Heinrich ............. H02K 19/103
310/114

(Continued)

FOREIGN PATENT DOCUMENTS

| CN | 102187547 A | 9/2011 |
| JP | 2000253634 A | 9/2000 |

(Continued)

OTHER PUBLICATIONS

PCT International Search Report and Written Opinion, PCT/GB2015/053548, dated Feb. 22, 2016.

(Continued)

*Primary Examiner* — Tran N Nguyen
(74) *Attorney, Agent, or Firm* — Quarles & Brady LLP

(57) ABSTRACT

An axial flux rotary generator comprising: two magnetic annuli; a coil annulus; the magnetic annuli and coil annulus having a common axis; the two magnetic annuli defining a plurality of magnetic fields around the common axis extending across a gap between the two magnetic annuli and the coil annulus having a sequence of coils attached around the common axis in the gap such that lines of magnetic flux from the magnetic fields cut the turns of the coils and thus induce electric current in the coils as the magnetic annuli are caused to rotate relative to the coil annulus; wherein a relative positioning of individual magnetic fields and a relative positioning of centers and sizing of individual coils in the sequence of coils is such that (i) the electric currents in the individual coils of the sequence of coils are in excess of (Continued)

three phases relative to one another, and (ii) the number of common factors other than one between the number of coils in the sequence of coils and the number of individual magnetic fields around the common axis is one or zero.

19 Claims, 12 Drawing Sheets

(51) Int. Cl.
*H02K 11/04* (2016.01)
*H02K 1/02* (2006.01)
*H02K 1/27* (2006.01)

(52) U.S. Cl.
CPC ....... *H02K 11/046* (2013.01); *H02K 2213/03* (2013.01); *Y02E 10/725* (2013.01)

(58) Field of Classification Search
CPC ...... H02K 1/2793; H02K 21/24; H02K 21/26; H02K 7/1838
See application file for complete search history.

(56) References Cited

U.S. PATENT DOCUMENTS

| | | | | |
|---|---|---|---|---|
| 4,358,693 A | * | 11/1982 | Palmer | H02K 25/00 310/112 |
| 4,371,801 A | * | 2/1983 | Richter | H02K 21/24 310/156.36 |
| 4,529,902 A | * | 7/1985 | Lordo | H02K 1/17 310/112 |
| 4,780,659 A | | 10/1988 | Bansal et al. | |
| 4,866,321 A | | 9/1989 | Blanchard et al. | |
| 5,184,040 A | * | 2/1993 | Lim | H02K 21/24 310/114 |
| 5,982,074 A | * | 11/1999 | Smith | H02K 3/04 310/156.36 |
| 7,042,109 B2 | * | 5/2006 | Gabrys | H02K 19/103 290/44 |
| 2004/0041409 A1 | | 3/2004 | Gabrys | |
| 2004/0108781 A1 | * | 6/2004 | Razzell | H02K 7/11 310/112 |
| 2008/0231132 A1 | | 9/2008 | Minowa et al. | |
| 2009/0134627 A1 | * | 5/2009 | Stiesdal | F03D 9/021 290/55 |
| 2009/0243301 A1 | * | 10/2009 | Longtin | F03D 7/02 290/55 |
| 2010/0032961 A1 | * | 2/2010 | Numajiri | F03D 1/0658 290/55 |
| 2010/0194251 A1 | | 8/2010 | Sikes | |
| 2012/0326541 A1 | | 12/2012 | Palmer et al. | |

FOREIGN PATENT DOCUMENTS

| | | |
|---|---|---|
| JP | 2005218263 A | 8/2005 |
| JP | 2007074820 A | 3/2007 |
| JP | 2011223848 A | 11/2011 |
| JP | 2014082821 A | 5/2014 |
| WO | 2010092402 A1 | 8/2010 |
| WO | 2010146368 A2 | 12/2010 |
| WO | 2015075456 A2 | 5/2015 |

OTHER PUBLICATIONS

Japan Patent Office, Notice of Reasons for Rejection, Application No. 2017-546050, dated Nov. 26, 2019, 22 pages.

* cited by examiner

Fig. 8

| No.Common Factors other than 1 | No. Magnets | Coils | Max | Min | Cogging Range | Mean | Cogging Ratio |
|---|---|---|---|---|---|---|---|
| 0 | 2 | 1 | 1 | 0 | 1.000 | 0.637 | 157.08% |
| 1 | 4 | 2 | 2 | 0 | 2.000 | 1.273 | 157.08% |
| 0 | 4 | 3 | 2 | 1.732 | 0.268 | 1.91 | 14.03% |
| 1 | 6 | 4 | 2.828 | 2 | 0.828 | 2.546 | 32.53% |
| 0 | 6 | 5 | 3.236 | 3.078 | 0.158 | 3.183 | 4.98% |
| 1 | 8 | 6 | 4 | 3.464 | 0.536 | 3.82 | 14.03% |
| 0 | 8 | 7 | 4.494 | 4.381 | 0.113 | 4.456 | 2.53% |
| 1 | 10 | 8 | 5.226 | 4.828 | 0.398 | 5.093 | 7.81% |
| 0 | 10 | 9 | 5.759 | 5.671 | 0.087 | 5.73 | 1.53% |
| 1 | 12 | 10 | 6.472 | 6.155 | 0.317 | 6.366 | 4.98% |
| 0 | 12 | 11 | 7.027 | 6.955 | 0.072 | 7.003 | 1.02% |
| 1 | 14 | 12 | 7.727 | 7.464 | 0.263 | 7.639 | 3.45% |
| 0 | 14 | 13 | 8.296 | 8.236 | 0.060 | 8.276 | 0.73% |
| 1 | 16 | 14 | 8.988 | 8.763 | 0.225 | 8.913 | 2.53% |
| 0 | 16 | 15 | 9.567 | 9.514 | 0.052 | 9.549 | 0.55% |
| 1 | 18 | 16 | 10.252 | 10.055 | 0.197 | 10.186 | 1.93% |
| 0 | 18 | 17 | 10.838 | 10.792 | 0.046 | 10.823 | 0.43% |
| 1 | 20 | 18 | 11.518 | 11.343 | 0.175 | 11.459 | 1.53% |
| 0 | 20 | 19 | 12.11 | 12.068 | 0.041 | 12.096 | 0.34% |
| 1 | 22 | 20 | 12.785 | 12.628 | 0.157 | 12.732 | 1.24% |
| 0 | 22 | 21 | 13.381 | 13.344 | 0.037 | 13.369 | 0.28% |
| 1 | 24 | 22 | 14.053 | 13.91 | 0.143 | 14.006 | 1.02% |
| 0 | 24 | 23 | 14.654 | 14.619 | 0.034 | 14.642 | 0.23% |
| 1 | 26 | 24 | 15.323 | 15.192 | 0.131 | 15.279 | 0.86% |
| 0 | 26 | 25 | 15.926 | 15.895 | 0.031 | 15.915 | 0.20% |
| 1 | 28 | 26 | 16.592 | 16.471 | 0.121 | 16.552 | 0.73% |
| 0 | 28 | 27 | 17.198 | 17.169 | 0.029 | 17.189 | 0.17% |
| 1 | 30 | 28 | 17.863 | 17.75 | 0.112 | 17.825 | 0.63% |
| 0 | 30 | 29 | 18.471 | 18.444 | 0.027 | 18.462 | 0.15% |
| 1 | 32 | 30 | 19.134 | 19.029 | 0.105 | 19.099 | 0.55% |

Fig. 8 (Cont.)

| | | | | | | | |
|---|---|---|---|---|---|---|---|
| 0 | 32 | 31 | 19.744 | 19.718 | 0.025 | 19.735 | 0.13% |
| 1 | 34 | 32 | 20.405 | 20.306 | 0.098 | 20.372 | 0.48% |
| 0 | 34 | 33 | 21.016 | 20.993 | 0.024 | 21.008 | 0.11% |
| 1 | 36 | 34 | 21.676 | 21.583 | 0.092 | 21.645 | 0.43% |
| 0 | 36 | 35 | 22.289 | 22.267 | 0.022 | 22.282 | 0.10% |
| 1 | 38 | 36 | 22.947 | 22.86 | 0.087 | 22.918 | 0.38% |
| 0 | 38 | 37 | 23.562 | 23.541 | 0.021 | 23.555 | 0.09% |
| 1 | 40 | 38 | 24.219 | 24.136 | 0.083 | 24.192 | 0.34% |
| 0 | 40 | 39 | 24.835 | 24.815 | 0.020 | 24.828 | 0.08% |
| 1 | 42 | 40 | 25.491 | 25.412 | 0.079 | 25.465 | 0.31% |
| 0 | 42 | 41 | 26.108 | 26.089 | 0.019 | 26.101 | 0.07% |
| 1 | 44 | 42 | 26.763 | 26.688 | 0.075 | 26.738 | 0.28% |
| 0 | 44 | 43 | 27.381 | 27.362 | 0.018 | 27.375 | 0.07% |
| 1 | 46 | 44 | 28.035 | 27.964 | 0.071 | 28.011 | 0.26% |
| 0 | 46 | 45 | 28.654 | 28.636 | 0.017 | 28.648 | 0.06% |
| 1 | 48 | 46 | 29.307 | 29.239 | 0.068 | 29.285 | 0.23% |
| 0 | 48 | 47 | 29.927 | 29.91 | 0.017 | 29.921 | 0.06% |
| 1 | 50 | 48 | 30.58 | 30.514 | 0.065 | 30.558 | 0.21% |
| 0 | 50 | 49 | 31.2 | 31.184 | 0.016 | 31.194 | 0.05% |
| 1 | 52 | 50 | 31.852 | 31.789 | 0.063 | 31.831 | 0.20% |
| 0 | 52 | 51 | 32.473 | 32.457 | 0.015 | 32.468 | 0.05% |
| 1 | 54 | 52 | 33.124 | 33.064 | 0.060 | 33.104 | 0.18% |
| 0 | 54 | 53 | 33.746 | 33.731 | 0.015 | 33.741 | 0.04% |
| 1 | 56 | 54 | 34.397 | 34.339 | 0.058 | 34.377 | 0.17% |
| 0 | 56 | 55 | 35.019 | 35.005 | 0.014 | 35.014 | 0.04% |
| 1 | 58 | 56 | 35.669 | 35.613 | 0.056 | 35.651 | 0.16% |
| 0 | 58 | 57 | 36.292 | 36.278 | 0.014 | 36.287 | 0.04% |
| 1 | 60 | 58 | 36.942 | 36.888 | 0.054 | 36.924 | 0.15% |
| 0 | 60 | 59 | 37.565 | 37.552 | 0.013 | 37.561 | 0.04% |
| 1 | 62 | 60 | 38.215 | 38.162 | 0.052 | 38.197 | 0.14% |

Fig. 9

| No. Common Factors | No. Magnets | Coils | Max | Min | Cogging Range | Mean | Cogging Ratio |
|---|---|---|---|---|---|---|---|
| 2 | 20 | 12 | 8 | 6.928 | 1.072 | 7.639 | 14.03% |
| 0 | 20 | 13 | 8.296 | 8.236 | 0.06 | 8.276 | 0.73% |
| 1 | 20 | 14 | 8.988 | 8.763 | 0.225 | 8.913 | 2.53% |
| 1 | 20 | 15 | 10 | 8.66 | 1.34 | 9.549 | 14.03% |
| 2 | 20 | 16 | 11.314 | 8 | 3.314 | 10.186 | 32.53% |
| 0 | 20 | 17 | 10.838 | 10.792 | 0.046 | 10.823 | 0.43% |
| 1 | 20 | 18 | 11.518 | 11.343 | 0.175 | 11.459 | 1.53% |
| 0 | 20 | 19 | 12.11 | 12.068 | 0.041 | 12.096 | 0.34% |

GENERATOR

CROSS-REFERENCE TO RELATED APPLICATIONS

This application represents the national stage entry of PCT International Application No. PCT/GB2015/053548 filed Nov. 20, 2015, which claims priority to Great Britain Patent Application 1420641.1 filed Nov. 20, 2014, the contents of which are hereby incorporated herein by reference for all purposes.

BACKGROUND ART

The following invention relates to an alternative and beneficial design of stator and/or rotor for a direct drive rotary generator, particularly a direct drive rotary generator which can be driven directly without the need for a gearbox and specifically for a generator in the form of an axial flux generator as disclosed in WO 2015/075456.

Such a direct drive generator is formed of an elongate cylindrical series of stator annuli and a coaxial elongate cylindrical series of rotor annuli and mounted for relative rotational movement around their common axis, the series of stator annuli interleaving the series of rotor annuli, and either of the rotor/stator annuli having a contiguous or substantially contiguous sequence of coils around its circumference, and the other of the rotor/stator annuli having a corresponding sequence of permanent magnets of alternating polarity spaced around its circumference and at the same pitch as that of the coils, the arrangement being such that lines of magnetic flux passing across the air gap between one magnet carrying annulus to the next cut the turns of the coils of the corresponding interleaved coil carrying annulus, and thus induce in the coils electromagnetic forces as the rotor is caused to rotate relative to the stator.

US 2008/231132 also discloses an axial flux generator and suggests ratios of magnets and coils which are suitable for directly generating three phase current which is often used for electricity transmission and distribution.

A key feature of the generator of WO 2015/075456 is that the pitch of the stator coils is selected to be the same as that of the rotor magnets. This ensures that the electromagnetic forces induced in each of the stator coils by the magnet carrying rotor are all in phase with one another. By this means, all of the outputs of the stator coils may conveniently be electrically connected to one another, so combining their respective outputs for feeding an electrical load.

However, a disadvantage arises from this arrangement. This is the effect known as cogging. Cogging is the variation in mechanical counter-torque which resists the applied torque used to turn the generator. In one form cogging arises as a result of the stator coils generating alternating current. Another severer form of cogging results from magnetic interaction between magnets of an armature and ferromagnetic material of the stator, for example ferrite material in the centre of coils of the stator.

US 2010/0194251 discloses an axial generator which works on different principles and in which paired spaced rotor disks each carry magnets so that pairs of magnets repel each other over a gap between the spaced rotor disks. A stator assembly in the gap comprises a series of coils with their centres filled with ferrite material. Such a system suffers from cogging originating from magnetic interaction between the magnets and the ferrite material. By using sixteen magnet pairs (and twelve coils) cogging due to magnetic interaction is reduced. However, no consideration is given to reduce any cogging resulting from the stator coils generating alternating current.

For the impellor of any wind turbine it is desirable to ensure that any torque ripple (resulting from the said cogging of either origin) arising from rotation of its generator is kept to a minimum practical. Any ripple "felt" by the blades of the impellor, even if the rotary inertia of the generator masks its inherent cogging in terms of fluctuations in its instantaneous rate of rotation, can be detrimental to their longevity, and even fatal if resonances occur. Ideally, cogging should be kept to 1% or less.

In addition, it is desirable for any generator used in such a wind turbine, especially one as is disclosed in WO 2015/075456 in which the magnets to be used are of the type known as ferrite, having weaker fields than the more commonly used type known as rare earth, that as much electrical energy as is possible be generated from the given volume occupied by the generator within the nacelle of the turbine.

To extract the maximum mechanical power from a wind turbine, it has been found beneficial to allow the blades of wind turbines to rotate at variable speed depending on the prevailing wind conditions. This flexibility is not possible in some conventional designs where for example, a three phase generator is driven by the wind turbine rotor and its output phases supply—and are locked onto—a national grid. In this case, the rate of rotation is dictated by the fundamental frequency of the grid (in the UK, 50 Hz, and USA 60 Hz).

Therefore there has been a move to process the electrical power generated by the generator by first rectifying it to direct current and then re converting the electrical power back e.g. to three phase suitable for feeding a national supply grid. In this case, the generator may then be permitted to run at a speed best suited for obtaining the maximum energy possible from the turbine blades.

In this case, the greater and smoother the power provided by the generator, the better.

Existing prior art (for example US 2008/231132) discloses the generation of three phase power. In this case, the useful energy, being the Root Mean Square, is 0.866 of the line peak. (In the case of a single phase system, it is 0.5 of the peak.)

SUMMARY OF INVENTION

An alternative construction to that of the aforementioned axial flux generator of WO 2015/075456 is preferred to overcome, or substantially overcome, these undesirable cogging forces while desirably also optimising the power generated for a given volume/size of generator.

According to the invention, a rotary generator comprises a stator annulus, an armature annulus, the stator annulus and armature annulus are coaxially mounted for relative rotation around their common axis; one of the stator annulus and armature annulus being a magnetic annulus defining a plurality of magnetic fields around the common axis and the other of the stator annulus having a sequence of coils circularly attached around the common axis such that lines of magnetic flux from the magnetic fields cut the turns of the coils and thus induce electric current in the coils as the stator annulus is caused to rotate relative to the armature annulus; wherein a spacing between individual magnetic fields and a spacing between centers of individual coils in the sequence of coils is such that the electric currents in the individual coils of the sequence of coils are in excess of three phases relative to one another.

The outputs of the coils of a generator constructed according to this arrangement will therefore be in four or more phases, as will be their corresponding cogging forces.

The benefit is to reduce greatly the overall cogging force, which for example in the case of a five phase arrangement, would be to under 20% of the case where all of the coil outputs are all in phase.

According to the present invention, there is provided an axial rotary generator comprising: two magnetic annuli; a coil annulus; the magnetic annuli and coil annulus having a common axis; the two magnetic annuli defining a plurality of magnetic fields around the common axis extending across a gap between the two magnetic annuli and the coil annulus having a sequence of coils attached around the common axis in the gap such that lines of magnetic flux from the magnetic fields cut the turns of the coils and thus induce electric current in the coils as the magnetic annuli are caused to rotate relative to the coil annulus; wherein a relative positioning of individual magnetic fields and a relative positioning of centers and sizing of individual coils in the sequence of coils is such that (i) the electric currents in the individual coils of the sequence of coils are in excess of three phases relative to one another, and (ii) the number of common factors other than one between the number of coils in the sequence of coils and the number of individual magnetic fields around the common axis is one or zero.

The outputs of the coils of a generator constructed according to this arrangement will therefore be in four or more phases, as will be their corresponding cogging forces. The fact that there are only a maximum of three (including 1) common factors between the numbers of coils and numbers of magnets greatly contributes to the reduction in the overall cogging force, which for example in the case of a five coil arrangement, would be to under 20% of the case where all of the coil outputs are all in phase.

In an embodiment none of the electric currents in the individual coils of the sequence of coils are in phase with one another and this further reduces cogging.

In practice, the stator of the generator (the coil annulus) may be assembled by laying the coils in preformed slots, or by simply potting them in an appropriate resin, in either case at the required angular displacement around the stator to ensure that none of the electric currents generated are in phase with one another.

In an embodiment, there is provided a rotary generator comprising: two magnetic annuli which are magnetically uncoupled; a coil annulus; the magnetic annuli and coil annulus having a common axis; the two magnetic annuli defining a plurality of magnetic fields around the common axis extending across a gap between the two magnetic annuli and the coil annulus having a sequence of coils attached around the common axis in the gap such that lines of magnetic flux from the magnetic fields cut the turns of the coils and thus induce electric current in the coils as the magnetic annuli are caused to rotate relative to the coil annulus; wherein a relative positioning of individual magnetic fields and a relative positioning of centers and sizing of individual coils in the sequence of coils is such that the electric currents in the individual coils of the sequence of coils are in excess of three phases relative to one another.

According to the invention, a direct drive rotary generator is formed of an elongate cylindrical series of stator annuli and a coaxial elongate cylindrical series of stator annuli and mounted for relative rotational movement around their common axis, the series of stator annuli interleaving the series of stator annuli, and either of the stator/stator annuli having a multiplicity and contiguous or substantially contiguous sequence of coils around its circumference, and the other of the stator/stator annuli having also a sequence of permanent magnets spaced around its circumference, close in number to, but not equal to, the number of coils comprising the stator, the magnets being of alternating polarity, the arrangement being such that lines of magnetic flux passing across the air gap between one magnet carrying annulus to the next cut the turns of the coils of the corresponding interleaved coil carrying annulus, and thus induce in the coils electromagnetic forces as the stator is caused to rotate relative to the stator, the arrangement being characterised in that the lateral width of the coils, in the direction of their line of travel, and thus their circumferential pitch, is selected to differ by a small margin that of the circumferential pitch of the magnets while still being effective to cut the lines of force of the magnets sandwiching it, the said lateral width also being so selected as to realise that the (whole) number of coils accommodated fills or substantially fills the circumferential distance available to them while also securing that each coil generates an electromagnetic force marginally out of phase with the majority or all or substantially all of the other coils.

In the invention, the RMS of the power generated is higher than for a one, two or three phase equivalent system. In the invention disclosed herein, and where there is an odd number of coils and an even number of magnets, there are as many phases as there are coils. In this case, the RMS of the power generated, at least for stators comprising a multiplicity of coils, e.g. 15 or above, reaches close to one, optimising the electrical energy generated from the room envelope available. In an embodiment, the RMS of the power generated by the generator is 0.95 or above.

A convenient method of achieving the objective of the invention, is to arrange for a pitch of the rotor magnetic fields to be different to a pitch of the coils. If the pitches of the magnetic fields and coils are constant around the circumference, any resistance to rotation, including any remaining cogging forces, will be substantially constant.

In an embodiment, the pitch of the magnetic fields is smaller than a pitch of the coils. This achieves the desired effect of there being more than three phases of electrical currents induced by the coils and also allows the coils to be made larger in outer diameter for the same inner diameter, resulting in more turns of the coils cutting the lines of magnetic flux and so a larger induced emf. In other words having the pitch of the magnetic fields being smaller than the pitch of the coils achieves the desired effect of allowing the coils to be made larger in outer diameter for the same inner diameter. This results in two benefits. The first being more turns of the coils cutting the lines of magnetic flux and the second, that the outer turns, having a larger diameter, are closer to the orthogonal ideal when cutting the flux. Both contribute to a larger induced emf.

Three or more phases can be achieved by there being a difference between the number of magnetic fields defined by the magnetic annulus to that of the number of coils in the sequence of coils.

In an example of a possible arrangement, the pitch between individual magnetic fields could be selected to be 11 units of length, and the spacing between centers of individual coils in the sequence of coils 12 units and so on. Thus, for a circumference respectively around the rotor/stator of 132 units, there would be 12 rotor magnetic fields and 11 coils.

In a specific embodiment, there is a difference of one between the number of coils and magnets. Preferably, the number of coils is odd.

Preferably the number of common factors other than one between the number of coils in the sequence of coils and the number of individual magnetic fields around the common axis is zero as this leads to the lowest cogging ratios.

According to a feature of the invention, the coils in the sequence of coils are substantially contiguous thereby substantially to fill the circumferential distance available to them. Because the coils are placed contiguously all around the circumferential distance available to them, no generating space is lost, and the maximum possible emf is generated for a given size of rotor/stator.

In an embodiment, the present invention provides a method of designing an axial flux rotary generator comprising: two magnetic annuli; a coil annulus; the magnetic annuli and coil annulus having a common axis; the two magnetic annuli defining a plurality of magnetic fields around the common axis extending across a gap between the two magnetic annuli and the coil annulus having a sequence of coils attached around the common axis in the gap such that lines of magnetic flux from the magnetic fields cut the turns of the coils and thus induce electric current in the coils as the magnetic annuli are caused to rotate relative to the coil annulus; wherein the method comprises:

specifying a relative positioning of individual magnetic fields and a relative positioning of centers and sizing of individual coils in the sequence of coils such that (i) the electric currents in the individual coils of the sequence of coils are in excess of three phases relative to one another, and (ii) the number of common factors other than one between the number of coils in the sequence of coils and the number of individual magnetic fields around the common axis is one or zero.

The preferred features of the axial flux rotary generator may be applied to the method.

The invention will now be described by way of example only with reference to the accompanying drawings in which.

Figure 6A:
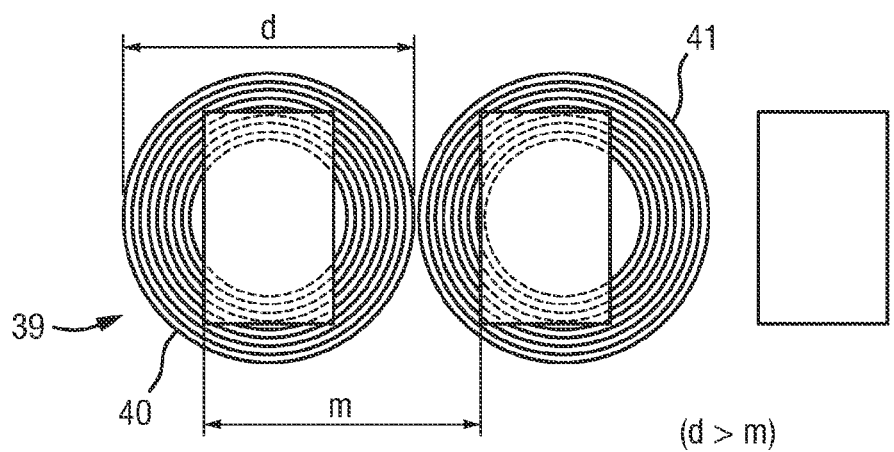
Figure 6B:
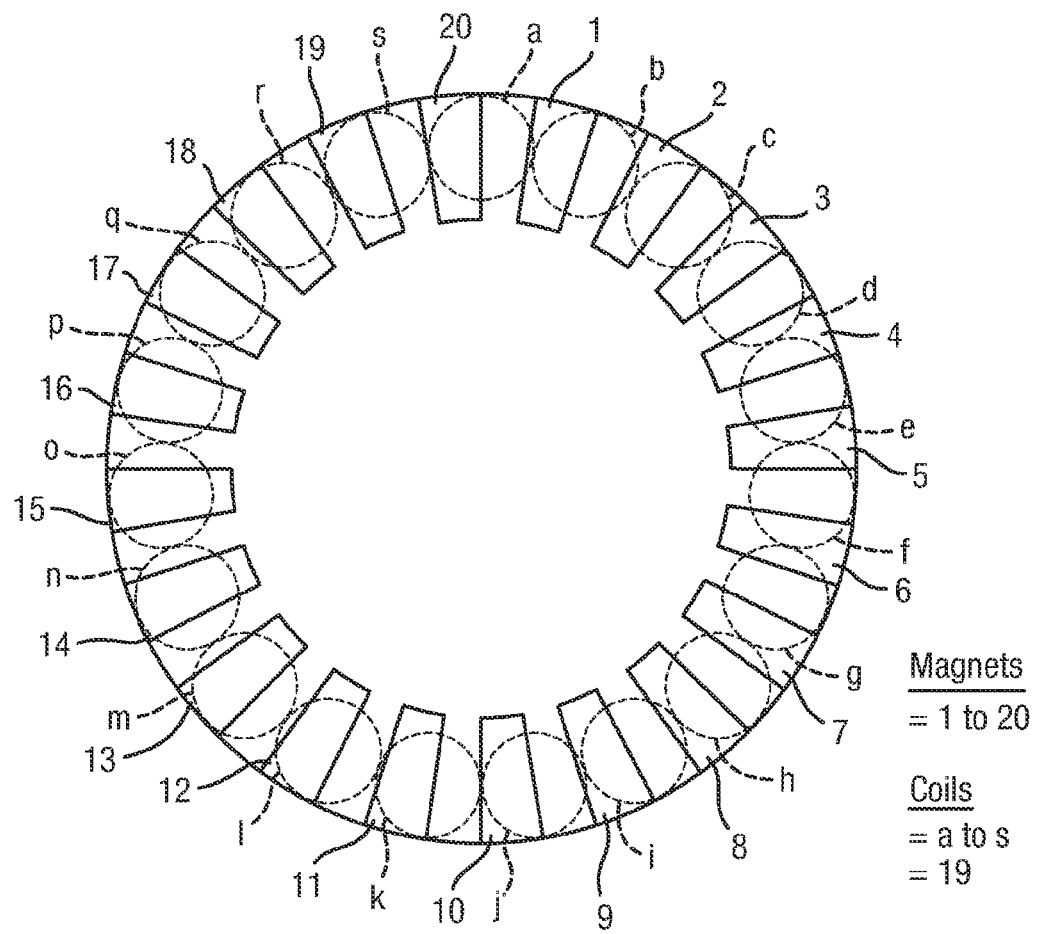
Figure 6C:
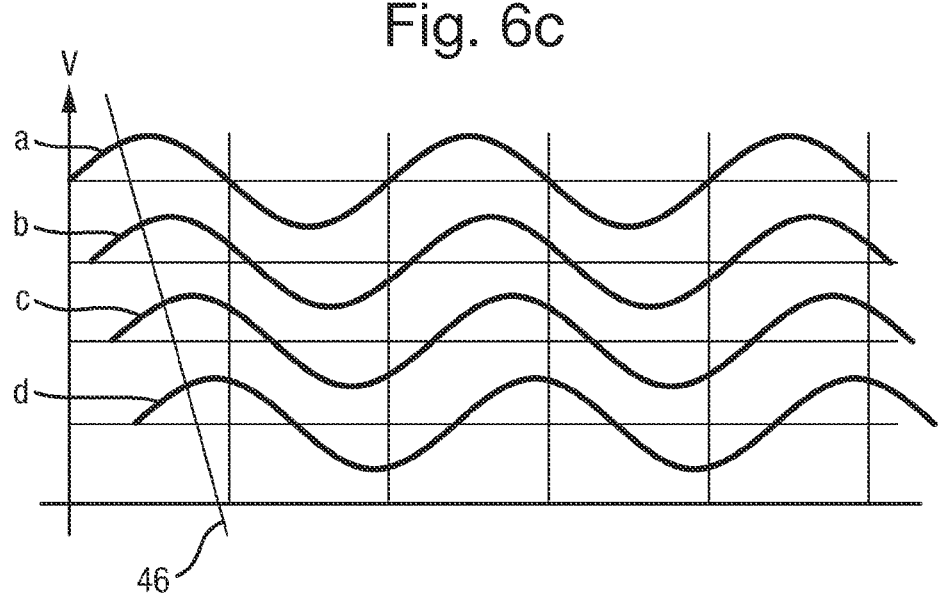
Figure 6D:
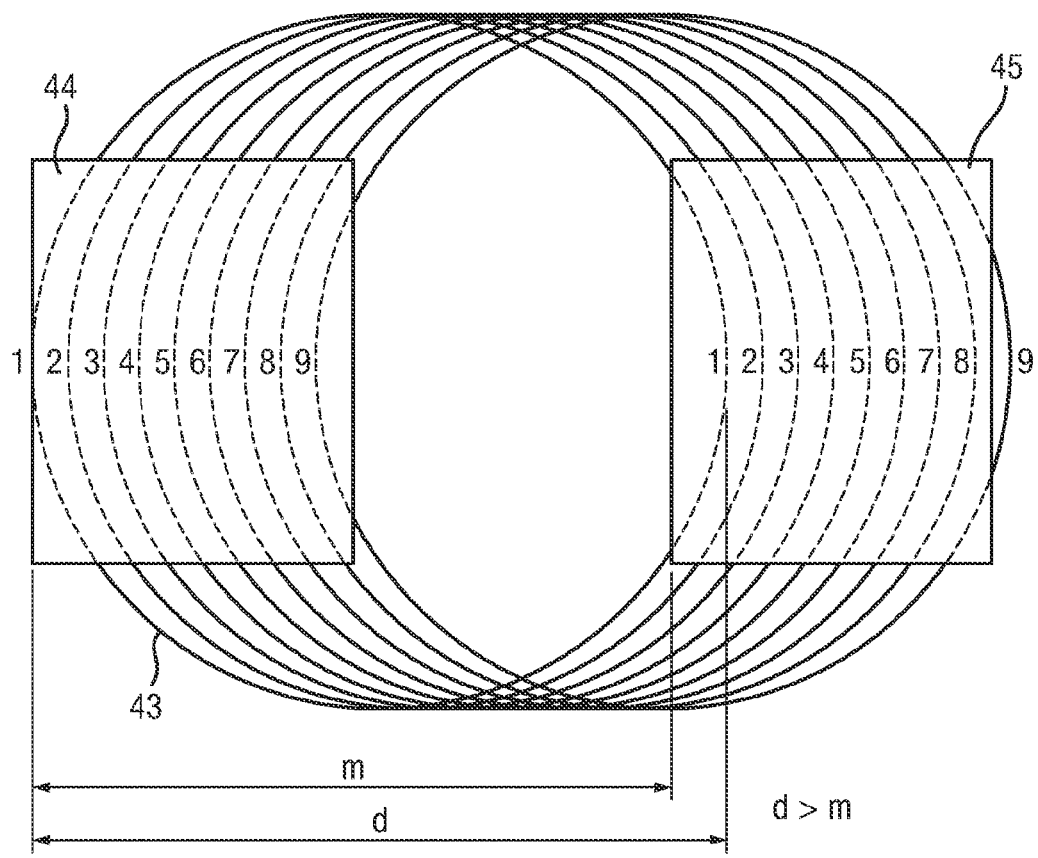
Figure 7:
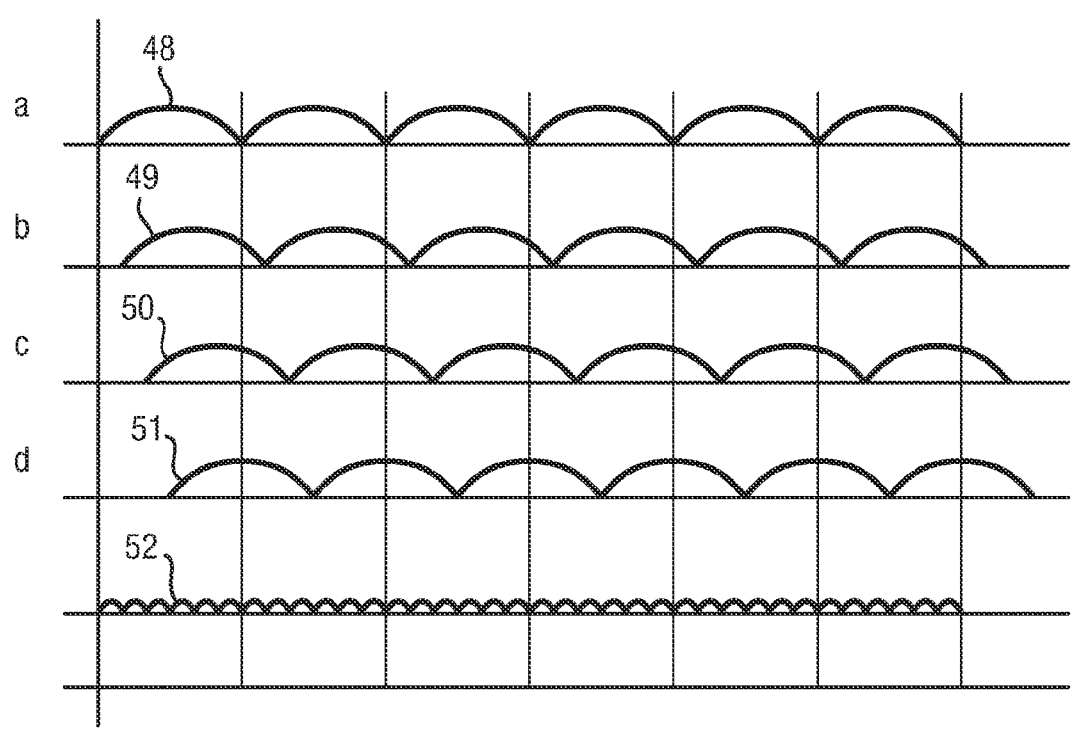
Figure 10:
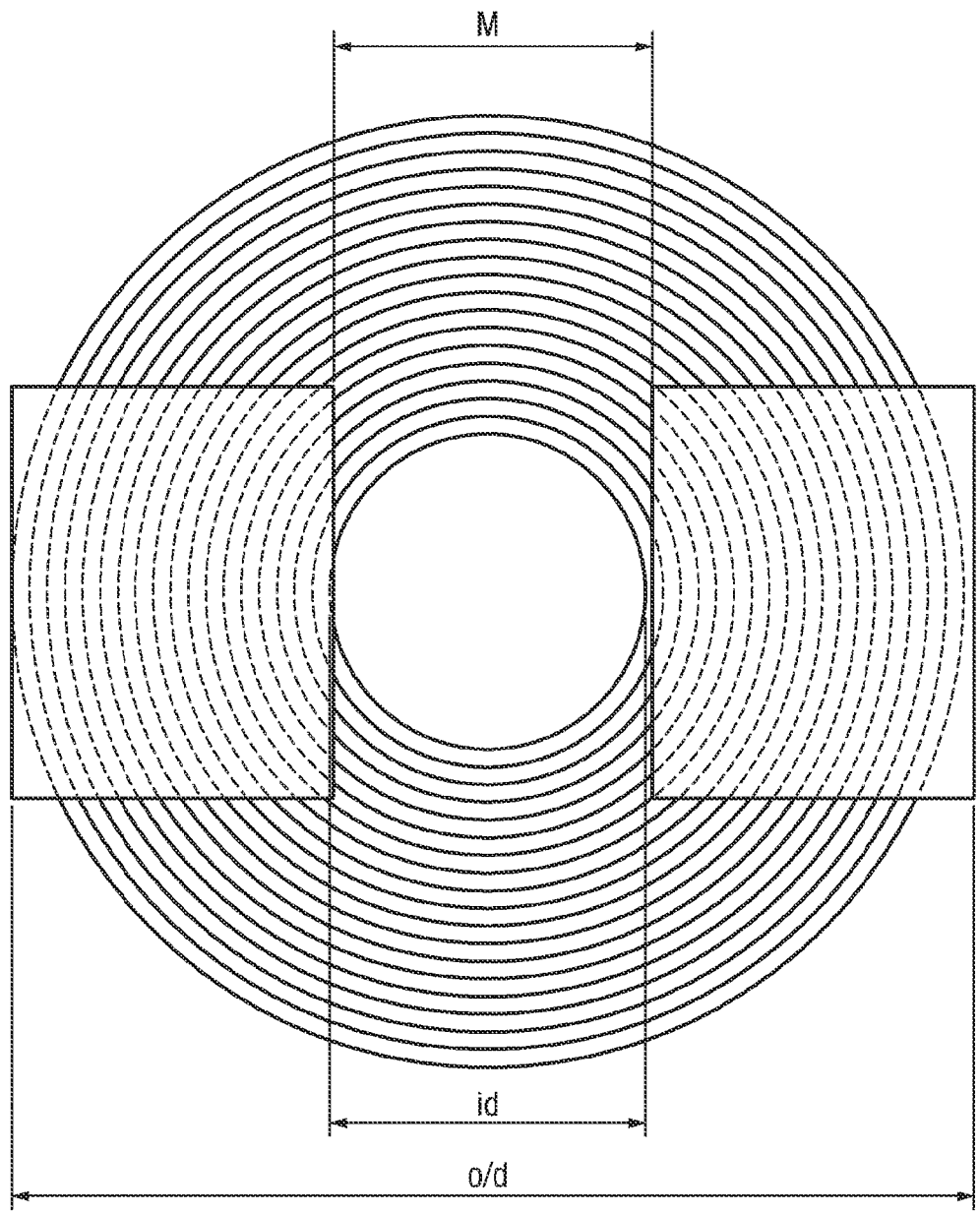
Figure 11:
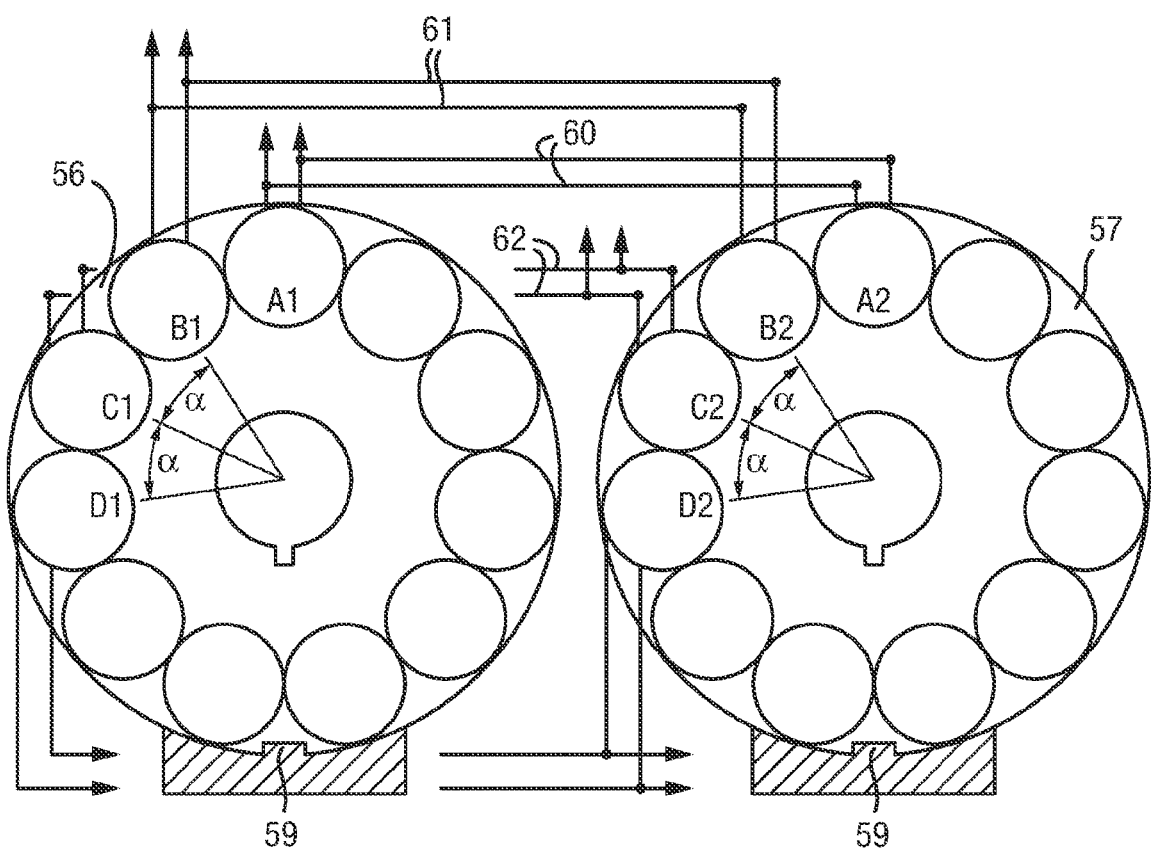
Figure 11:
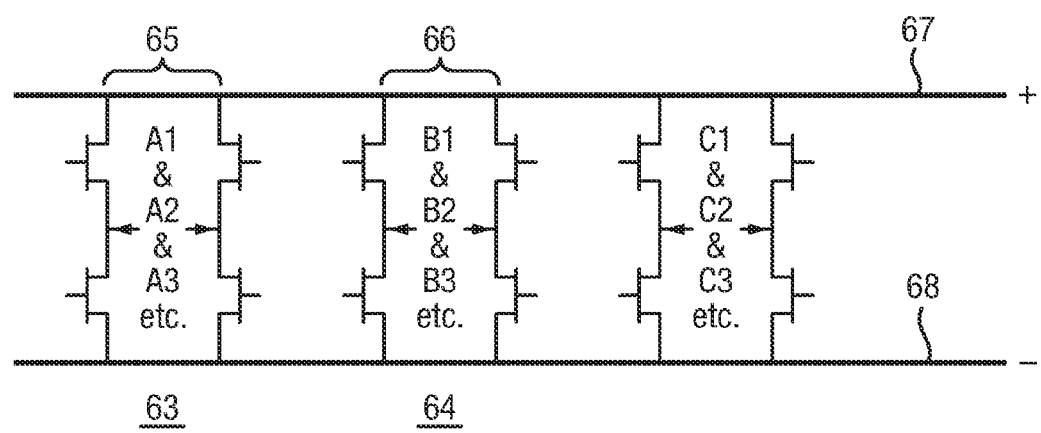
Figure 12A:
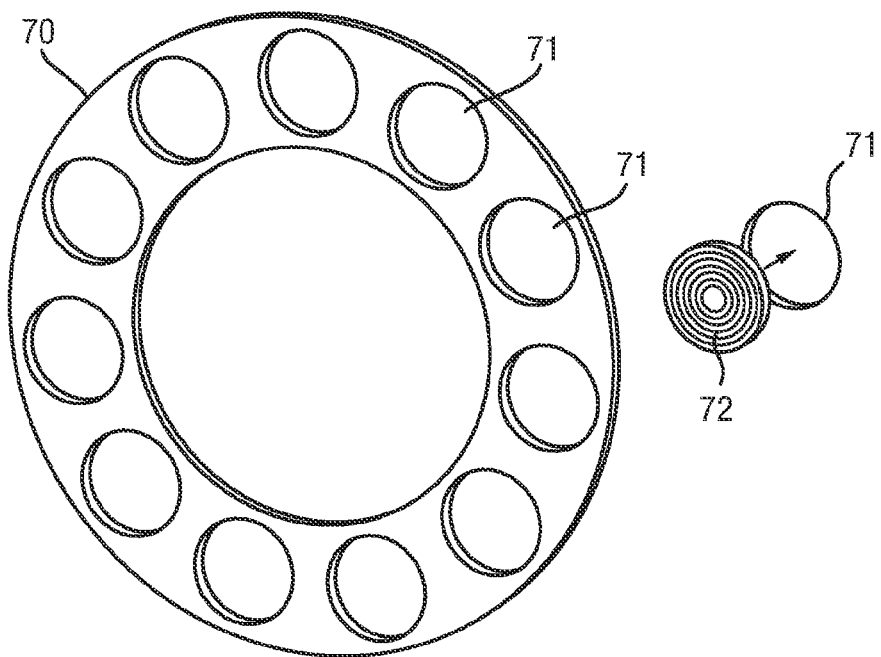

FIGS. 6a to d show stator and rotor components of the invention;

FIG. 7 shows the cogging force arising from the arrangements of FIG. 6;

FIG. 8 are the results of a mathematical analysis into cogging forces;

FIG. 9 are the results of a mathematical analysis into cogging forces;

FIG. 10 shows the practical limits on coil sizes;

FIG. 11 is a circuit diagram indicating a method of connecting the stator coil outputs; and FIGS. 12a and b are schematic illustrations of the way of assembling a generator according to the present invention.

In order to facilitate an understanding of the present invention, and the method whereby cogging is eliminated or substantially eliminated, a general description of my original first generator, as disclosed in WO 2015/075456, is first given.

Figure 1:
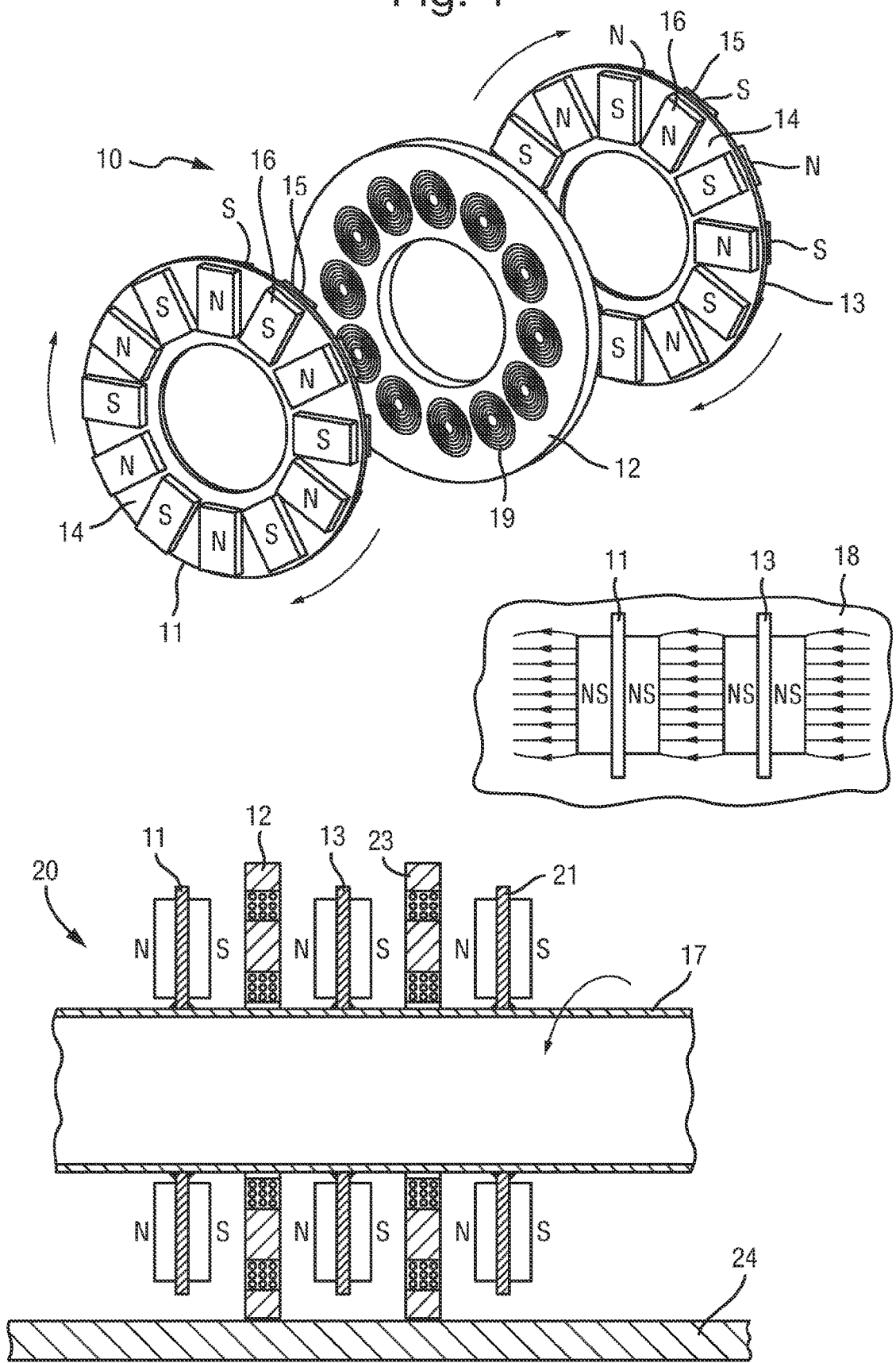
FIG. 1 shows an exploded view of a generator of the present invention.

Referring to FIG. 1, the principal components of this first generator 10 are shown in exploded view at 11, 12 and 13 which are stator and armature annuli coaxially mounted for relative rotation around their common axis. 11 and 13 are rotating rotors or armature annuli or magnetic annuli.

Although the generator 10 is described as having two (or more) magnetic annuli 11, 13, a generator 10 as described herein will function with only one magnetic annulus.

Each magnetic annuli 11, 13 comprises a ferromagnetic annulus 14 onto and around each side of which are affixed in attraction permanent magnets 15 and 16 to form a magnetic annulus defining a plurality of magnetic fields around the axis of the rotating rotors 11, 13. In an embodiment, the outward facing polarities of the magnets alternate from north to south around the annulus as shown such that the magnetic fields are of alternating polarity. This allows adjacent magnetic fields to be closely spaced, thereby optimising induced emf for a given generator diameter. The rotors 11 and 13 are each located on a central cylinder 17, but are one magnet pole pitch displaced from their facing neighbours, such that all of the magnets on the rotors are in attraction, and lines of magnetic flux can cross freely all the way across the gap from one rotor disc to the next. This is further illustrated by the inset diagram shown at 18. In an embodiment, the magnetic annuli 11, 13 are magnetically uncoupled from each other (apart from the magnets). This means that there is no magnetic material connecting the magnetic annuli 11, 13 together. The flux crossing the gap, and thus cutting the stator coils, is entirely between facing magnets. This helps concentrate flux across the gap. In other words, no physical magnetic coupling between the magnetic annuli 11, 13 is required in order to generate significant amounts of emf. In an embodiment, each of the stator/armature annuli is self contained, in as much that no or substantially no physical magnetic coupling and/or actual magnetic contact is required between them for efficient operation of the generator.

The coil carrying stator annuli or coil annuli 12 are sandwiched between the rotating rotors 11, 13, and are maintained stationary relative to the rotating rotors 11, 13. Each stator annuli 12 carries a series of contiguous, or nearly contiguous, coils 19 in the gap. By contiguous or nearly contiguous is meant a lateral gap between adjacent sides of coils being no more that 10% of their circumferential lateral width. In an embodiment, the coils 19 are sited around the stator annulus 12 circumference. The coils 19 may be circularly attached around the common axis as illustrated. The stator annuli 12 are affixed to mounting means (not shown) to maintain them equally spaced in between the armature annuli 11, 13. A generator of modest rating could comprise just two armature annuli 11, 13 sandwiching a single stator annulus 12, or even just one armature annulus 11 and one stator annulus 12, but the arrangement can be repeated for the requisite generator capacity along the full length of the generator, as shown at 20, where 11 and 13 and 21 are rotating magnetic rotors and 12 and 23 are the stator coil annuli. The stator coil annuli 12 and 23 are in this case shown mounted on a portion of an external supporting structure 24. In the particular arrangement shown, the circumferential pitch of the magnets is the same as that of the coils (which is not in accordance with the present invention).

Although the magnets are shown on the rotating annuli 11, 13 and 21 in fact they could alternatively be mounted on the stator annuli 12 and 23 and the coils 19 be mounted on the rotating (armature) annuli 11, 13 and 21. In this case, suitable commutation means would be required to conduct the generated emf away from the rotors.

The sequence of coils is circularly attached around the common axis such that lines of magnetic flux from the magnetic fields cut the turns of coils 19 and thus induce electric current in the coils 19 as the armature annulus is caused to rotate relative to the stator annulus. In the case of three magnetic annuli 11, 13 and 21, the coils are in the gap between the three magnetic annuli 11, 13 and 21.

Figure 2:
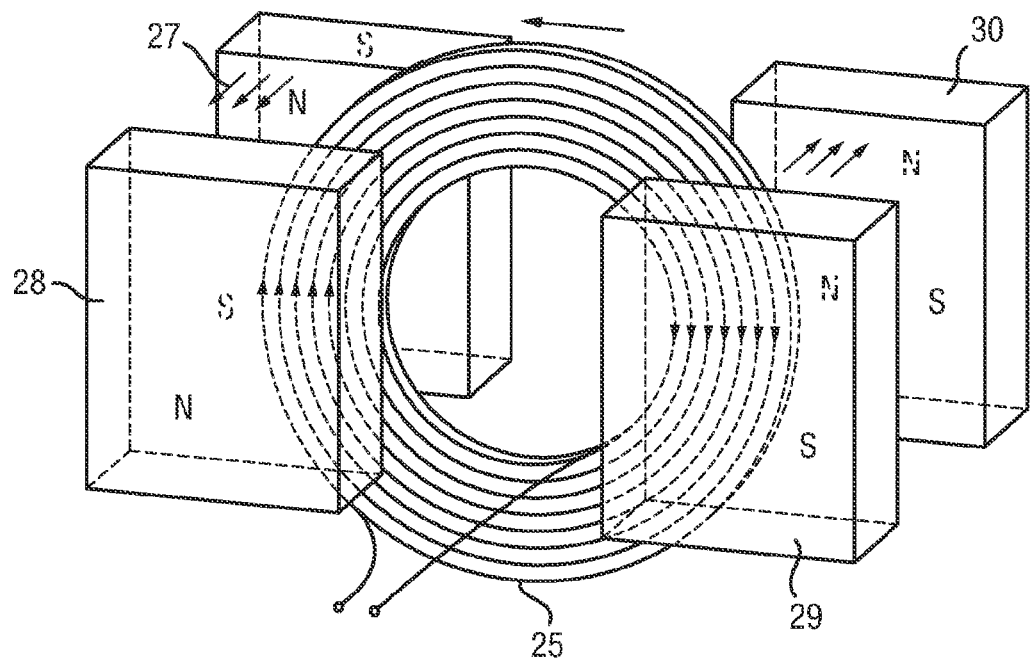
FIG. 2 shows in detail a section of the stator and stator of the generator.

The principle of operation is now explained with reference to FIG. 2. A single coil 25 is shown passing through the gap defined in between the facing permanent magnets 27 and 28, 29 and 30. (This is a representation of a single coil from a stator annulus sandwiched between two pairs of rotor magnets. Note, for convenience of illustration the coil is shown moving through the magnetic fields, as opposed to the actual case where the magnet carrying rotors rotate relative to the stationary stators).

Figure 3:
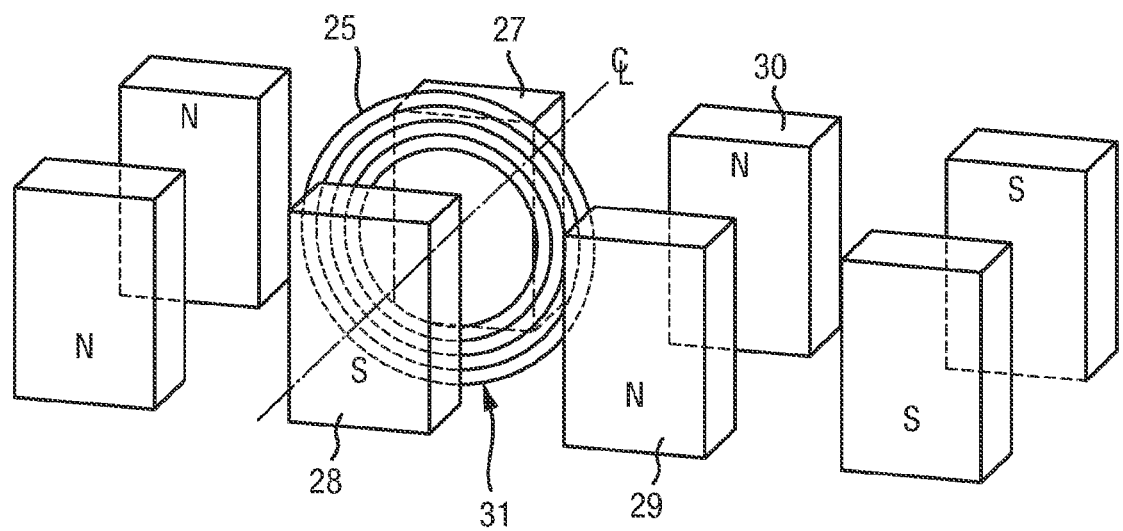
FIG. 3 is a further view of the magnet and coil arrangement.

An electromagnetic force is induced in the coil as follows. The left hand portion of the coil 25 cuts the lines of force crossing from the north face of magnet 27 to the south face of magnet 28. An "upwards" (clockwise) emf is induced in the left hand side of the coil. The right hand side of the coil similarly cuts lines of force, but which pass this time from the north pole of 29 to the south pole of 30. On account of this reversal of flux direction, a "downwards" (also clockwise) emf is induced. Thus the two emfs, both acting in the clockwise sense, add to generate a flowing current in the coil. From the foregoing, it will be seen from examination of FIG. 1, in which the pitch of the coils is the same as that of the magnets, that all of the coils generate simultaneously and in phase as they cut across the magnetic fields passing between the faces of the magnets sandwiching them. The emf generated alternates from plus to minus as the coils are crossed by fields alternating in direction around the rotor. The zero generation point occurs as the coil straddles symmetrically the center of any one set of facing magnets, as shown at 31 in FIG. 3.

According to a feature of the generator, the spacing between individual magnetic fields, the spacing between the centers of individual coils and the geometry of the individual coils is such that turns of one side of the coils are in a first magnetic field of the plurality of magnetic fields at the same time as turns of the other side of the coils are in a magnetic field of opposite polarity of the plurality of magnetic fields adjacent to the first magnetic field. This ensures that the diameter of the coil is not such that its respective side portions, in the direction of travel, could overlap to any significant extent, lines of force of the same polarity. If that does occur, the emf generated on one side of the coil would counter that being generated on its other side and a reduction in efficiency would result. So the generation of emf is optimised for as much of the travelled distance possible as any one coil passes through the fields provided by the magnetic fields.

It is a desirable feature of any electrical machine to achieve as many turns within its stator (or rotor—as the case may be) as is practically possible within the given room envelope occupied by its stator, (or rotor). Arrangements of the prior art for example, in which coils are placed in groups separated from one another in order to generate a distinct number of phases, are wasteful of available coil slot space, as this space could also be used for power generation.

In an embodiment, the sequence of coils is substantially contiguous, thereby substantially to fill the circumferential distance available to them. This optimises the amount of emf generated for a given size of generator.

A preferred form of coil for use in a generator of this type, is one having a circular, or near circular, profile, and which generates an emf which is substantially sinusoidal.

Such coils are easier to manufacture (e.g. by winding around a mandrel) than other shapes and practically generate more emf as for example square coils for a given footprint.

The present invention does not require any ferromagnetic material in the center of the coils or otherwise in the coil annulus. This is because the flux jumps straight across the gap, cutting the coils. This can be thought of as a pure physics design compared to designs where significant electricity can only be generated in the presence of ferromagnetic material (usually iron teeth). In the present design, the presence of any iron would only add to cogging, as well as heating effects due to the dissipation of undesirable parasitic eddy currents. Therefore the coil annulus is free of ferromagnetic material, particularly in the center of the coils.

Figure 4:
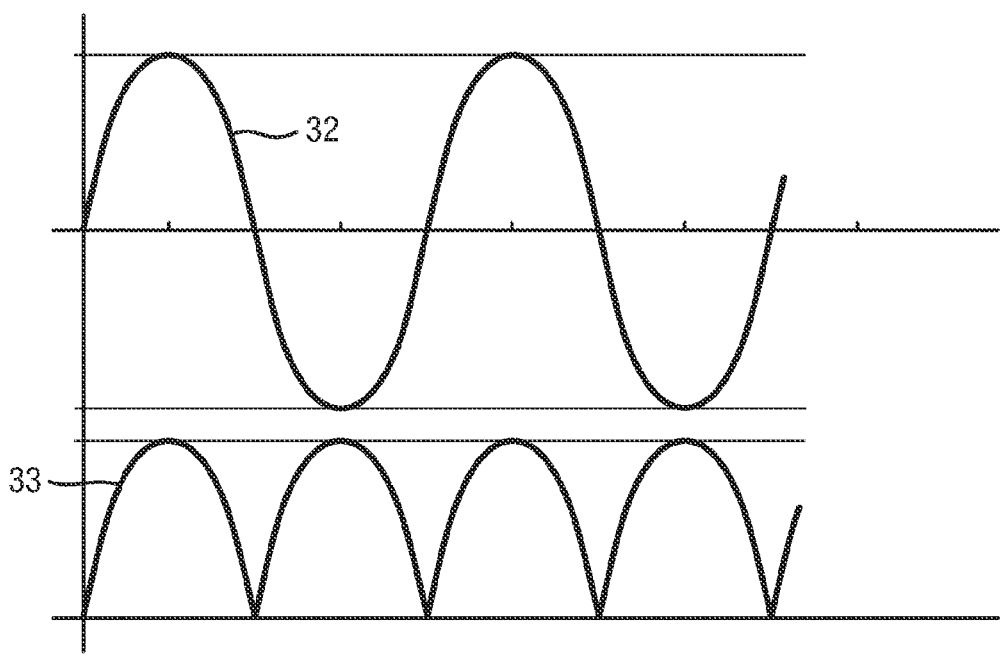
FIGS. 4 to 5 are diagrammatic representations of generated electromagnetic and cogging forces.

A resistive mechanical "cogging force" arises, in compliance with Lenz's law, as the coils generate their respective emfs. This cogging force is the physical manifestation of the work done in converting forced mechanical motion of a conductor through a changing magnetic field, and thus the generation of electrical energy (assuming the conductor is connected to an electrical load). The cogging force follows the pattern and rectified sense of the generated emf, as illustrated in FIG. 4. The alternating current generated is shown at 32 and the cogging force arising at 33. Note, the cogging force arises only in the positive sense, as it always serves to resist the applied motion.

By way of explanation, for an individual coil at the peak of generation, which occurs at or near the peak of the induced electromagnetic force, (hereinafter referred to for convenience as "emf") the counter torque force reaches a maximum. This then diminishes to zero as the induced emf itself reduces to zero, and then rises again as the next peak is reached. These torque cogging forces are not especially significant in lower output devices, for example one to ten kilowatt generators. Nor are they so manifest in generators run at medium or high speeds (e.g. non direct drive generators) as the rotary inertia of the rotor is effective to swamp the cogging forces. However, for direct drive rotary generators running at very low speeds, for example up to thirty rpm, particularly ten to thirty rpm, the forces can be severe and very evident, especially for generators having megawatt generating capacities. The counter torque can vary for example from zero to mega Newton meters for each magnetic period of rotation of the rotor relative to the stator. This can be extremely deleterious to the functioning and mechanical survival of these electromagnetic machines, but even more importantly, to the blades of the impellor turning the generator.

An important distinction exists between the form of cogging associated with the generator of this invention, and that associated with traditional design generators. In the case of the generator of this invention, its stator coils are not mounted upon, nor wound upon, ferromagnetic—for example soft iron—teeth, as is the case with the majority of other traditional design generators. Cogging in this latter case is of a relatively higher frequency and is associated with the variable reluctance between the magnetic field generators and the multiple stator teeth. Many designs have been evolved to address this problem such as described in US 2010/0194251. In the present case, the coils are simply self supporting windings through which the rotor magnetic fields can directly pass, and which are mounted within a non-magnetic substrate and are thus devoid of any internal or extraneous magnetic material. The flux from the permanent magnets sandwiching and cutting across the coils is effective itself to induce an emf in the said coils without the need for any additional ferromagnetic coupling. Cogging by comparison is thus of a lower frequency.

Figure 5:
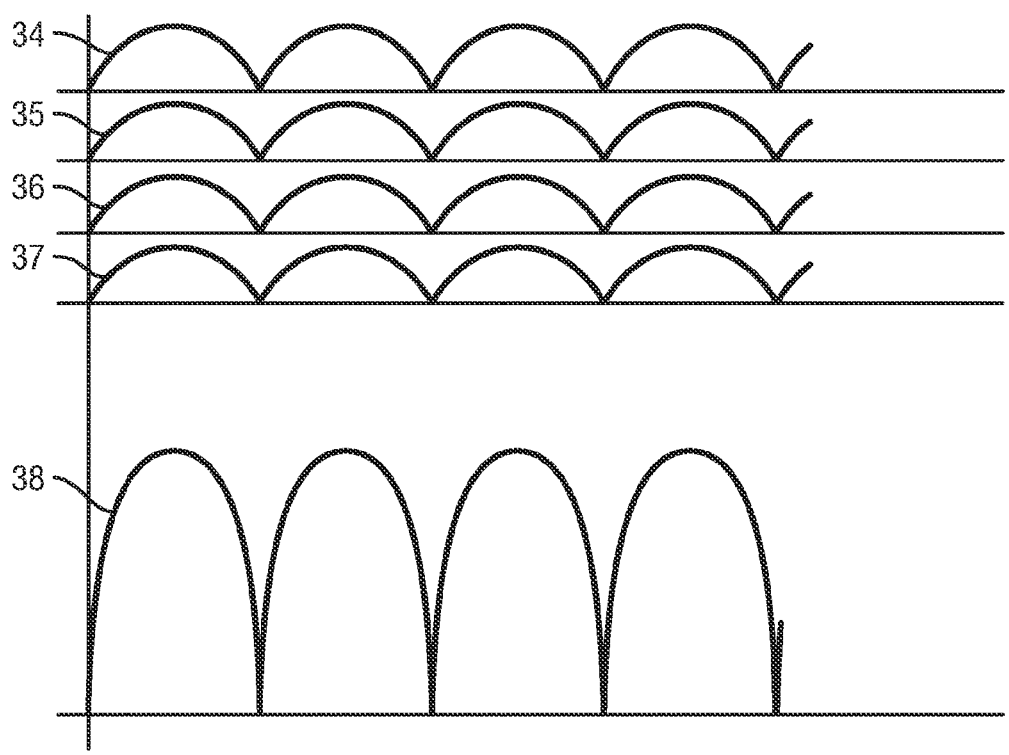

In the case of the generator shown at FIG. 1, in which all of the coils are at the same circumferential pitch as that of the pairs of magnets sandwiching them, it will be readily appreciated that all of the cogging forces produced by all of the coils are in addition, as shown schematically at FIG. 5, where, by way of example, four cogging forces are shown at 34 to 37, resulting in the large additive waveform at 38.

For any size generator, this is a disadvantage, but for large size machines rotating slowly, i.e. where the benefits of rotary inertia are negligible, the cogging forces are both apparent and truly substantial, even in the order of hundreds of thousands of Newton meters for a single rotor annulus, or taken as a whole over an entire generator with an output of 5 MW, millions of Newton meters. This gives rise to significant vibration and is deleterious to the smooth operation of a rotary generator of this type. Significant long term mechanical difficulties can result.

Methods of ameliorating this effect are described in the aforementioned co-pending application. In one disclosed method, rather than the coils being disposed contiguously around the circumference of the stator, they are instead placed as three groups, each group being phase displaced from the next by ⅔ π radians conveniently to produce three phase current resulting in a reduction of cogging to one quarter that of an uncorrected arrangement.

US 2008/231132 also discloses generating three phase current, but does not suggest that this might lead to a reduction in cogging forces.

However, even with this improvement, the forces remaining are substantial and disadvantageous and unacceptable for the safe operation of a wind turbine.

A method of substantially overcoming this problem, is to ensure that a spacing between and/or relative positioning of individual magnetic fields and a spacing between centers and/or relative positioning of centers and sizing of individual coils in the sequence of coils is such that the electric currents in the individual coils of the sequence of coils are in excess of three phases relative to one another. This also has the effect of increasing the RMS of the power generated. In an embodiment, the RMS is 0.95 or above. This can be achieved by increasing the number of phases.

Arranging for a multi phase output such as at least four different phases of induced emf to be produced can be done in any number of different ways. For example the coils can be placed in n groups, each displaced by 2/n π radians (with the same pitch in each group of coils as the pitch of the magnets) to produce n phases of induced emf. Alternatively, the coils and/or magnets can be positioned irregularly. But a preferred arrangement is one in which the respective pitches of the coils and magnets is constant. This is advantageous as it results in the most even distribution of forces in the armature and the axle 17 as the armature rotates.

As described below, dealing with multiple phases such as four or more phases of induced current may involve its own challenges, but these are outweighed by the ability to reduce cogging. But if too many phases are present, this is also undesirable.

Therefore in an embodiment there are 100 or fewer different phases, desirably 50 or fewer.

In practice, it is desirable to reduce the cogging forces as much as possible.

An embodiment, in accordance with the present invention, is now described with reference to FIG. 6.

Rather than each coil having the same pitch as that of the magnets traversing past it, the coils are instead each constructed such as to be slightly wider, thereby realising a marginal difference between their pitches compared to that of the magnets. This is shown at 39 in FIG. 6a where the coils 40 and 41 have a diameter "d" (equal to the pitch between centers of the coils) marginally greater than the pitch "m" of the magnets. The difference in pitch is arranged to be such that, for a given number of coils, the final coil around the circle of coils "meets up" with the start coil without any significant gap therebetween, thereby ensuring advantage is taken of the full circumferential distance available for generation. Thus the pitch of the magnetic fields is smaller than a pitch of the coils and the number of magnetic fields is different to (larger than) the number of coils. A practical example of this, as shown in FIG. 6b, would be a rotor carrying 20 permanent magnets, the angle between them therefore being 360/20=18°, and a stator carrying 19 coils, where the angle subtended between them is 18.95°.

In consequence of the difference in pitch, it is clear that the emf generated by any one coil, and thus its corresponding cogging force, will be slightly out of phase with that generated by its neighbour. Thus, were the emf generated by a first coil to vary with sine ø, (as is typically the case for electrical generators) where o represents the angular displacement of the coil passing the magnets over a full cycle, the emf generated by the following coil will vary by sine (ø+δø). Subsequent coils will repeat this pattern, i.e. sine (ø+2δø), sine (ø+3δø) and so on.

This is shown at 46 in FIG. 6c, where each of the generated emfs of several consecutive coils are shown slightly displaced from one another. FIG. 7 shows the corresponding cogging forces, 48-51. Thus, in an embodiment a spacing between individual magnetic fields and a spacing between centers of individual coils in the sequence of coils is such that the electric currents in the individual coils of the sequence of coils are each out of phase with both neighbouring coils by the same angular difference. In an embodiment, a relative positioning of individual magnetic fields and a relative positioning of centers and sizing of individual coils in the sequence of coils is such that none of the electric currents in the individual coils of the sequence of coils are in phase with one another.

It is evident that the mathematical addition of the cogging force profiles does not now result in a single major waveform with a substantial ripple, as was shown in FIG. 4 at 38, but rather one having only a modest ripple in amplitude, as now shown at 52 in FIG. 7. Mathematical analysis demonstrates that for a stator comprising an even number of coils, plus two in number of magnets, the amplitude of the ripple reduces by approximately π/N where N is the number of coils. (Note, this applies to the case where the rotor also has an even number of magnets, and N is significant, for example >10). The results of the mathematical analysis are shown at FIG. 8, where the reduction in cogging force is shown in the right hand most column according to the number of coils present, as shown in the third column. This analysis assumes circular coils and even strength magnetic fields one more in number than the number of coils for an odd number of coils, and two more than the number of coils for an even number of coils, shown in the second column. This ensures that the magnetic fields extend evenly around the circumference and are positioned with alternating polarity.

The analysis represents an idealized machine with coils of a size to experience a peak force of 1.0 units varying sinusoidally. The fourth column represents the maximum force and the fifth column the minimum force during a cycle. The sixth column represents the difference between the maximum and minimum forces, being the cogging range and the seventh column is the mean force during a cycle. The cogging ratio is calculated as being the cogging range as a percentage of the mean value.

FIG. 8 shows that the cogging ratio generally decreases with an increase in the number of coils and number of magnet pairs. For those cases where there is no common factor other than one between the number of magnets and the number of coils (i.e. factors of each number that are the same ("common") other than 1), the cogging ratio is reduced. For example, in the case of four coils and six magnets, 1 and 2 are the common factors between four (the number of coils, the factors being 1, 2 and 4) and six (the number of magnets, the factors being 1, 2, 3 and 6). Therefore there is one common factor (the number 2) other than one (as illustrated in the first column of FIG. 8). As can be seen in the right hand most column of FIG. 8, four coils and six magnets results in a relatively high cogging ratio of 32%. However, if the number of coils is increased to five and the number of magnets maintained at six, there are no common factors other than one between five (the number of coils) and six (the number of magnets). As a result, the cogging ratio reduces to under 5%. If the number of coils is increased to six and the number of magnets to eight, the cogging ratio increases to 14% compared to the case where there are only five coils; the number of common factors between six (the number of coils) and eight (the number of magnets) being two (the numbers 1 and 2). As can be seen by inspection of FIG. 8, for those situations where there are no common factors other than 1 between the number of coils and the number of magnets, the cogging ratio is reduced compared to similar numbers of coils and magnets where there is a common factor other than one between the number of coils and the number of magnets.

FIG. 9 shows the results of simulations which are the same as FIG. 8. However, in these simulations the number of magnets are maintained at 20 and the number of coils are varied from 12 to 19. As can be seen, for those cases where there are two common factors other than 1 between the numbers of coils and the number of magnets (for example 16 coils and 20 magnets, the common factors being two and four, that is, 16 being divisible by two and four and 20 also being divisible by two and four) the cogging ratio is about 30%. The case of 20 magnets and 12 coils is similar in having the common factors of two and four and the cogging ratio is similarly high at 14%. For the case where there is a single common factor other than 1, the cogging ratio varies between 1½ and 14%. In the case of 20 magnets and 15 coils the cogging factor is relatively high because the geometry means that the current in the coils is not all out of phase with one another; only three phases of current will be generated. Thus geometries which generate 3 or fewer phases are avoided. For those cases where there are no common factors other than one between the number of magnets and the number of coils, the cogging ratio is less than 1%.

From the results in Tables 8 and 9, it can be seen that the cogging ratio is decreased for lower numbers of common factors other than one which exist between the number of magnets and the number of coils. In an embodiment the number of common factors other than one between the numbers of magnets and numbers of coils is one or zero. Preferably the number of common factors between the numbers of magnets and numbers of coils other than one is zero.

Preferably for a number of coils greater than three, the number of common factors other than one between the number of magnets and number of coils is zero, so that the cogging ratio can be reduced to below 5%. Preferably for a number of coils of nine or more, the number of common factors other than one between the numbers of magnets and numbers of coils is one or zero, so that the cogging ratio is 5% or less. Preferably for a number of coils greater than nine, the number of common factors other than one between the numbers of magnets and numbers of coils is zero, so that the cogging ratio is reduced to about 1% or less. In an embodiment the number of coils is preferably five or more, preferably seven or more and most preferably ten or more or more preferably 20 or more as the more coils present the lower the cogging ratio, provided that the current generated in the coils is of four or more phases, preferably all out of phase with one another and that the number of common factors other than 1 between the number of magnets and the number of coils is one or zero.

In the case of a generator equipped with stators to which a significant number of coils are attached, such as eleven or more, the cogging force is very much lowered. This is because of the gradual displacement of each of the coils relative to the magnetic field generators of the stator thus ensuring that their electrical outputs and thus each of their corresponding cogging forces is out of phase with electric currents induced in all of the other coils in the sequence of coils.

By way of an additional example, a 20 coil stator generator with 22 magnetic fields would benefit from a reduction to just 1.24% of the full amplitude cogging force. In this case, the cogging reduces in proportion to $\pi/N$.

However, as also illustrated by the analysis, the ripple decreases significantly if an odd number of coils is utilised. In this case, as aforesaid, it is reduced in proportion to $\pi/4N$ or just 0.34% of the full amplitude in the case of a 20 magnet rotor and a 19 coil stator. This is on account of the fact that in the case of an even number of coils, the rectified emfs of coils e.g. diametrically opposite one another are additive, as opposed to the case of an odd number of coils, where none can add directly to its corresponding near opposite number. Therefore, desirably the number of coils is odd.

As the polarity of the magnets alternate around the circumference of the armature annulus, unless the number of magnets is even, it is necessary to leave a space between two of the magnets otherwise two magnets of the same polarity are next to each other. This is undesirable in terms of maximising generated emf for a given size of generator. Therefore preferably the number of magnets is even.

The ideal difference between the number of coils and magnet pairs is one, as this results in the aggregation for any sized generator of the closest phase shifted outputs, and thus the minimum possible cogging. It also secures the greatest generation of electrical power, as the coils are closest in alignment to the fields they are cutting. In practice, this may not be possible, due to practical constraints such as the width of commercially available permanent magnets. In any case, the difference in number of coils should be between 1 and 5, preferably between one and three and even more preferably just 1, particularly for a rotor carrying a substantial number of magnets, for example 20. This achieves a fine difference in pitch. Mathematical analysis shows that the finer the difference in pitch between the magnetic fields and the number of coils, the better the reduction in overall cogging force.

In practice, the actual achievable difference may be dictated by practical considerations, such as the standardised industrial width of components used to provide the rotor magnetic fields and so on.

A very good arrangement would thus be one on which the rotor comprised twenty permanent magnets, and the stator, nineteen coils.

In order for the cogging force to be reduced as shown in the tables of FIGS. 8 and 9 by the inventive geometrical arrangement, the current (not phase) generated in each of the coils when passing through the magnetic fields must be equal in magnitude in use.

Thus, in use, each coil must be electrically connected to draw the same current as the other coils.

The number of magnets could be smaller than the number of coils (and/or the pitch of the magnets larger than the pitch of the coils). However, this would result in the diameter of the coils needing to be smaller than optimal, resulting in a lower emf generation for a given flux density of the magnetic fields.

The present invention will work with fewer than 8 magnetic fields, but cogging is reduced more by increasing the number of magnetic fields (and number of coils) to 8 or beyond (for example to 10 or more or 15 or more). There is no theoretical limit to the number of magnetic fields or coils. However, too many coils will lead to increased complexity. So a practical limit to the number of magnetic fields and/or coils might be 100 or fewer, say 80 or fewer, or 70 or fewer or 60 or fewer or even 50 or fewer in any sequence of coils.

The arrangement of using coils of a larger diameter is possible without significantly compromising the performance of the generator. This can be seen at FIG. 6d, where the coil 43 is shown moving incrementally past the facing magnets 44 and 45. At any of the marked positions, the turns of the coil are clearly cut by the flux available. In addition, because the coil now has a larger diameter, the lateral portions of the outside turns of the coil cut the magnetic lines of force passing across it closer to the orthogonal ideal, thus generating—in adherence with Fleming's right hand rule—an increased emf. There is a limit upon this increase in lateral width, and attention must be paid also to the inside diameter of the coil. Efficiency decreases if any portion of both sides of a coil (or significant portions of such a coil) cut lines of magnetic force having the same gradient. As a general rule, the difference in magnitude between the outer radius OD and the inner radius ID of a given coil is preferably equal to or less than the circumferential distance M between adjacent magnetic fields. An example of this is shown at FIG. 10. Efficiency is decreased unless a difference in magnitude between the outer radius OD and the inner radius ID is equal to or less than the distance M between adjacent magnetic fields.

Efficiency is also decreased unless the circumferential spacing between individual magnetic fields, the circumferential spacing between the centers of individual coils and the geometry of the individual coils is such that turns of one side of the coils are in a first magnetic field of the plurality of magnetic fields at the same time as turns of the other side of the coils are in a magnetic field of opposite polarity of the plurality of magnetic fields adjacent to the first magnetic field.

The magnetic fields could be provided by electromagnets. However, according to a feature of the invention, the means needed for providing the magnetic fields are permanent magnets as described above. Preferably the permanent magnets are provided on the rotating rotor rather than on the stator annulus. This is because it is more convenient if the coils are non-moving relative to the rest of the generator due to the required electrical connections of the coils. It is common practice for permanent magnet machines to utilise rare earth magnets to provide the magnetic flux necessary for operation. However, these are both expensive and severe constraints currently exist as to their availability. It is therefore preferable to use an alternative material.

According to a feature of the invention, the magnets are ferrite magnets. These are fabricated from commonly available materials, but provide weaker flux levels than rare earth magnets (typically about one third). However, their cost per unit weight is approximately one twentyseventh (2014), dwarfing the additional associated costs necessitated by their use, such as an increase in the volume and therefore cost of copper coils required. Additionally, it is easier to focus the lines of flux of a ferrite magnet than those of a rare earth magnet.

For any generator rotating at a given speed, the emf generated is dependent on two principal factors; a) the number of turns comprising its coils and b) the strength of the magnetic fields cutting them.

Thus, for a given flux level, it is a practical benefit for the coils to be formed of as many turns as possible. According to a feature of the invention, this can be conveniently realised by augmenting the diameter of the coils up to the maximum allowable as defined by the room envelope available for their contiguous placing around the circumference of the stator. The increase in diameter realises more turns (the inner diameter of the coils remains unchanged) and thus a corresponding increase in the emf generated by the coil as its now augmented number of turns cut the lines of force provided by the magnets. Given that the pitch of the magnets remains unchanged, the increase in the circumferential pitch of the coils also secures, in accordance as aforesaid with the invention, a difference between their respective spacings, and resulting from this, a difference between the number of coils and the number of magnets.

However, there is yet a further benefit. The emf generated by the turns of any coil is dependent on the degree to which its turns cut the lines of force passing across them orthogonally. By way of explanation, in the case of a circular or nearly circular coil, the δ1 portion of each turn which crosses the lines of force exactly orthogonally generates the maximum emf, and this reduces with the curvature of the turn, such that the top (or bottom) portions of the turn contribute nothing. Thus, in the case of the now larger coil, its outer layers (now having a larger radius and therefore being closer to the orthogonal ideal) cut the lines of force more effectively, with a commensurate increase in the emf generated, as opposed to the previous coil of lesser diameter. This compensates to a degree for the lesser number of coils accommodated around the stator on account of their increased diameter.

It will be seen from the foregoing that the virtual elimination of cogging forces, combined with an increase in the emfs generated, results in a significant improvement in both mechanical and electrical performance.

Whilst the above examples have been given in relation to a stator formed of round or near round coils, the same principle of the invention also applies were the coils to be of rectangular form or near rectangular form or the like. In this case, cogging is reduced by the same method, e.g. there being a marginal difference between the lateral width of the (now) rectangular coils and the circumferential pitch of the magnets. For clarity, the same criteria applies as to the efficacy of this method depending on whether there is an even number of coils and magnets, or that one is of an odd number.

A generator in accordance with the invention may be formed of a number of stators and rotors, the stators being sandwiched successive rotors. Magnetic fields from the magnetic field generators on one rotor cut through the coils held by the sandwiched stator to the magnetic field generators on the facing rotor. Sufficient rotors/stators may be added to utilise fully and convert to electricity all of the mechanical energy available to turn the generator.

It will be recalled in accordance with one aspect of the invention, that none of the coil outputs are in phase with one another. Therefore if their outputs are connected directly together at least some loss in efficiency will occur. Indeed, by way of example, in the case of there being an even number of coils, for the two stator coils that are diametrically opposite, were they to be connected directly together, their emfs would cancel out, resulting in no generation. This is in contrast to the original arrangement as disclosed in WO 2015/075456 where the pitch of the stator coils equalled the pitch of the magnets resulting in same phase generation of all of the emfs, and thus allowed all of the coil outputs to be connected directly together.

As a result of this aspect, in an embodiment, each emf from each coil is first rectified, for example by an IGBT controlled rectifier, and the resultant same sense direct currents (dc) are all combined for example onto a dc bus bar before use is made of the electricity generated. This is however a minor consideration, as these forms of rectifier are rugged, available and inexpensive. It is also current practice to convert emfs generated to dc for subsequent conversion back to alternating current by IGBT back to back converters.

In an embodiment outputs of coils whose induced electrical currents are not in phase with one another are connected to different rectifiers.

In an embodiment outputs of coils whose induced electrical currents are in phase with one another are connected together.

According to a feature of the invention, electronic circuitry connected to the outputs of the coils of the generator is provided and comprises individual active rectifier means connected to each of the outputs such as to enable the power generated within the coils all to be drawn equally and be combined optimally onto one or more busbars.

For certain mechanical sizes of generator, for example those having a particularly large rotary inertia and therefore capable of masking a certain degree of cogging, it may be possible to compromise and connect selected groups of coils together for rectification, for example adjacent pairs of coils, thus to reduce the number of rectification stages necessary.

This aforementioned consideration, namely the need to first rectify and then combine the coil outputs, can be minimised however, for a generator comprising a multiplicity of stators and rotors. It will be appreciated that for any series of stators, their manufacturing process can easily be such as to ensure that all the coils around the stator occupy the same slots in terms of angular location around their circumference.

According to a further feature of the invention, each coil in a specific angular location within its coil annulus is connected to the corresponding coil in the same specific angular location in the next coil annulus and so on, their combined outputs then being fed to rectifier means. This thus minimises the number of rectifiers needed. (This arrangement assumes that all of the magnet carrying magnetic annuli along the length of the central cylinder of the generator are also in the same angular position).

A method of effecting the rectification is now explained with reference to FIG. 11. Two stators are shown, for clarity side by side at 56 and 57. Their precise angular alignment upon their mounting means is secured by means of a keyway 59. This ensures that each coil stator plate is located at precisely the same angular position around the stator as its neighbour. A similar arrangement exists for locating the magnet carrying stators upon their central cylinder (not shown).

Resulting from this, the outputs of any set of coils occupying the same angular position around their respective stators can all be combined, as they will each be in phase. This is shown at 60, 61 and 62, where the output of coil A1 is connected to coil A2, B1 to B2, C1 to C2 and so on. The now combined emfs can be fed to a controlled full phase rectifier, such as an IGBT based circuit, as shown by way of example at 63 and 64. The rectified outputs 65 and 66 can then be safely combined onto bus bars 67 and 68.

For a substantial generator, comprising for example fifty stator plates, a substantial reduction is realised in the overall number of rectifier 63, 64 required.

The generator of the invention can be manufactured comfortably to a considerable size to convert directly to electricity mechanical energy input powers of 5 MW and above.

A method of designing an axial flux rotary generator and in particular specifying the geometry of the coils and magnets in accordance with the above teaching will be apparent from the above.

Figure 12B:
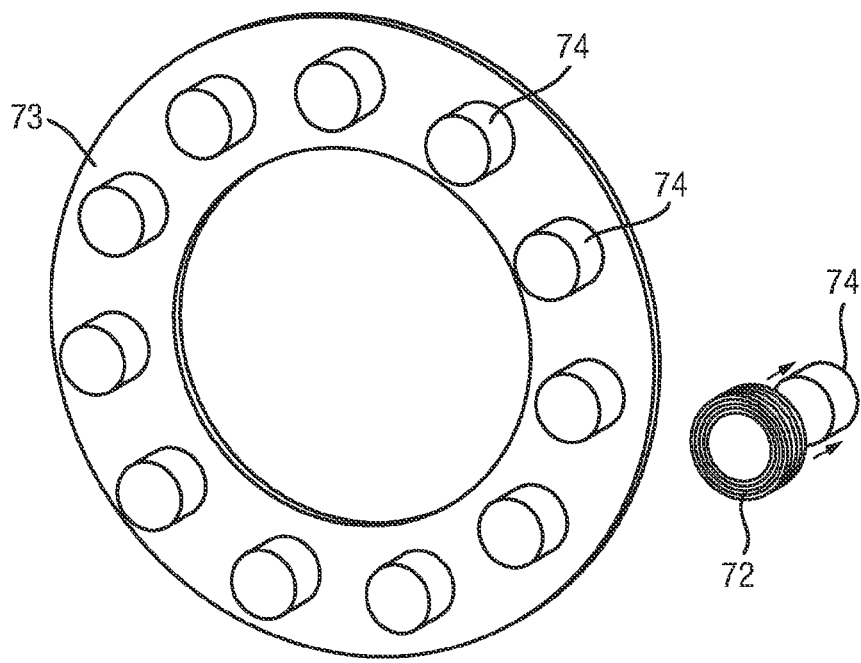

A method of assembling coils within the stator of the generator is now shown with reference to FIGS. 12a and 12b. A typical stator of the invention is shown generally at 70 in FIG. 12a. In this case, preformed slots 71 are formed within the stator into which the coils 72 are assembled and then potted with a suitable resin, such as EIP4260. An alternative arrangement is shown with reference to FIG. 12b. In this case, an outer sheet 73 having bosses 74 protruding therefrom is utilised, the stator coils 72 being first lowered onto the bosses and then potted. A further possibility (not shown) is for the coils simply all to be carefully prearranged within confining inner and outer walls on a non-stick surface, such as PTFE and then resin poured over them to maintain them all in position without any additional mechanical means of location.

In any of these three cases, the sizing of the coils, and their angular location around the ring they constitute, is such as to ensure in accordance with the invention that none of the electric currents induced in them are in phase with one another.

In the first aspect of the invention there is provided a rotary generator comprising two magnetic annuli; a coil annulus; the magnetic annuli and coil annulus having a common axis; the two magnetic annuli defining a plurality of magnetic fields around the common axis extending across a gap between the two magnetic annuli and the coil annulus having a sequence of coils attached around the common axis in the gap such that lines of magnetic flux from the magnetic fields cut the turns of the coils and thus induce electric current in the coils as the magnetic annuli are caused to rotate relative to the coil annulus; wherein a relative positioning of individual magnetic fields and a relative positioning of centers and sizing of individual coils in the sequence of coils is such that the electric currents in the individual coils of the sequence of coils are in excess of three phases relative to one another.

In a second aspect of the invention there is provided the rotary generator of the first aspect, wherein a pitch of the magnetic fields is different to a pitch of the coils.

In a third aspect of the invention there is provided the rotary generator of the second aspect, wherein the pitch of the magnetic fields is smaller than a pitch of the coils.

In a fourth aspect of the invention there is provided the rotary generator of the first, second or third aspects, wherein the number of magnetic fields defined by the magnetic annulus is different to the number of coils in the sequence of coils.

In a fifth aspect of the invention there is provided the rotary generator of the fourth aspect, wherein the difference in number of magnetic fields compared to number of coils is between 1 and 5, preferably between 1 and 3 and most preferably is equal to 1.

In a sixth aspect of the invention there is provided the rotary generator of the fourth or fifth aspects, wherein the number of magnetic fields defined by the magnetic annulus is greater than the number of coils in the sequence of coils.

In a seventh aspect of the invention there is provided the rotary generator of any of the preceding aspects, wherein the number of coils in the sequence of coils is odd.

In an eighth aspect of the invention there is provided the rotary generator of the preceding aspects, wherein the number of magnetic fields defined by the magnetic annulus is even.

In a ninth aspect of the invention there is provided the rotary generator of any of the preceding aspects, wherein the coils in the sequence of coils are substantially contiguous thereby substantially to fill the circumferential distance available to them.

In a tenth aspect of the invention there is provided the rotary generator of any of the preceding aspects, wherein the turns of the coils have an outer radius and an inner radius, a difference in magnitude between the outer radius and the inner radius being equal to or less than the distance between adjacent magnetic fields.

In an eleventh aspect of the invention there is provided the rotary generator of any of the preceding aspects, wherein the spacing between individual magnetic fields, the spacing between the centers of individual coils and the geometry of the individual coils is such that turns of one side of the coils are in a first magnetic field of the plurality of magnetic fields at the same time as turns of the other side of the coils are in a magnetic field of opposite polarity of the plurality of magnetic fields adjacent to the first magnetic field.

In a twelfth aspect of the invention there is provided the rotary generator of any of the preceding aspects, wherein the magnetic fields of the sequence of magnetic fields alternate in polarity.

In a thirteenth aspect of the invention there is provided the rotary generator of any of the preceding aspects, wherein the magnetic annulus is comprised of a plurality of permanent magnets.

In a fourteenth aspect of the invention there is provided the rotary generator of the thirteenth aspect, wherein the permanent magnets are ferrite magnets.

In a fifteenth aspect of the invention there is provided the rotary generator of any of the preceding aspects, wherein the coils are substantially circular.

In a sixteenth aspect of the invention there is provided the rotary generator of any of the preceding aspects, wherein the number of magnetic fields defined by the magnetic annulus is 8 or more, preferably 10 or more and most preferably 15 or more, or 40 or more, or 45 or more or even 50 or more.

In a seventeenth aspect of the invention there is provided the rotary generator of any of the preceding aspects, wherein the spacing between individual magnetic fields and the spacing between centers of individual coils in the sequence of coils is such that electric current induced in each coil is out of phase with electric currents induced in all of the other coils in the sequence of coils.

In an eighteenth aspect of the invention there is provided the rotary generator of any of the preceding aspects, wherein the two magnetic annuli are magnetically uncoupled.

In a nineteenth aspect of the invention there is provided the rotary generator of any of the preceding aspects, wherein the two magnetic annuli are magnetically coupled.

In a twentieth aspect of the invention there is provided the rotary generator of any of the preceding aspects, comprising a series of the coil annuli interleaving a series of the magnetic annuli.

In a twenty first aspect of the invention there is provided the rotary generator of the twentieth aspect, wherein the relative angular placement of the coil annuli and/or magnetic annuli are such that electric currents induced in the coils of adjacent sequences of coils are substantially in phase with one another.

In a twenty second aspect of the invention there is provided the rotary generator of the twenty first aspect, wherein the relative angular placement of the coil annuli and/or magnetic annuli are such that electric currents induced in the coils of adjacent sequences of coils are substantially out of phase with one another.

In a twenty third aspect of the invention there is provided the rotary generator of any of the preceding aspects, wherein the coils do not require any ferromagnetic material in the coil carrying annulus for the purpose of generating significant electricity.

In a twenty fourth aspect of the invention there is provided the rotary generator of any one of the preceding aspects, wherein outputs of coils whose induced electrical currents are not in phase with one another are connected to different rectifiers.

In a twenty fifth aspect of the invention there is provided the rotary generator of any one of the preceding aspects, wherein outputs of coils whose induced electrical currents are in phase with one another are connected together.

In a twenty sixth aspect of the invention there is provided the rotary generator of any one of the preceding aspects, wherein the RMS of the power generated by the generator is 0.95 or above.

In a twenty seventh aspect of the invention there is provided the rotary generator of any of the preceding aspects, wherein there is an absence of ferromagnetic material in the center of the coils.

In a twenty eighth aspect of the invention there is provided the rotary generator of any of the preceding aspects, wherein a spacing between individual magnetic fields and a spacing between centers of individual coils in the sequence of coils is such that the electric currents in the individual coils of the sequence of coils are each out of phase with both neighbouring coils by substantially the same angular difference.

In a further aspect of the invention there is provided a rotary generator according to any preceding aspect in which a relative positioning of individual magnetic fields and a relative positioning of centers and sizing of individual coils in the sequence of coils is such that (i) none of the electric currents in the individual coils of the sequence of coils are in phase with one another, and/or (ii) the number of common factors other than one between the number of coils in the sequence of coils and the number of individual magnetic fields around the common axis is one or zero.

In a twenty ninth aspect of the invention there is provided electronic circuitry connected to the outputs of the coils of a generator according to any of the preceding aspects, comprising individual active rectifier means connected to each of the said outputs such as to enable the power generated within the coils all to be combined substantially equally onto one or more busbars.

In a thirtieth aspect of the invention there is provided the method of generating electricity using the rotary generator of any of the first to twenty eighth aspects.

In a thirty first aspect of the invention there is provided the electricity generated by the method of the thirtieth aspect.

In a thirty second aspect of the invention there is provided a wind turbine comprising a rotor for turning wind energy into rotational energy, wherein the rotor is directly coupled to the rotary generator of any of first to twenty eighth aspects so that the generator is directly driven by the rotor.

The invention claimed is:

1. A wind turbine comprising:
   a rotor; and
   an axial flux rotary generator comprising:
   two magnetic annuli comprised of a plurality of permanent magnets;
   a coil annulus;
   the magnetic annuli and coil annulus having a common axis;
   the plurality of permanent magnets of the two magnetic annuli defining a plurality of magnetic fields around the common axis extending across a gap between the two magnetic annuli and the coil annulus having a sequence of coils comprising individual coils attached around the common axis in the gap such that lines of magnetic flux from the magnetic fields cut a plurality of turns of the sequence of coils and thus induce electric current in the sequence of coils as the magnetic annuli are caused to rotate relative to the coil annulus;
   wherein a relative positioning of individual magnetic fields and a relative positioning of centers and sizing of the individual coils in the sequence of coils is such that (i) the electric currents in the individual coils of the sequence of coils are in excess of three phases relative to one another, (ii) a number of common factors between a number of coils in the sequence of coils and a number of individual magnetic fields around the common axis excluding the common factor one is one or zero, and (iii) the number of magnetic fields defined by the magnetic annuli is 8 or more; and
   wherein the rotor is directly coupled to the axial flux rotary generator so that the generator is directly driven by the rotor to turn wind energy into rotational energy,
   wherein a spacing between individual magnetic fields and a spacing between centers of individual coils in the sequence of coils is such that the electric currents in the individual coils of the sequence of coils are each out of phase with both neighboring coils by substantially the same angular difference, thereby to reduce a cogging ratio to 5% or less.

2. The wind turbine of claim 1, wherein a difference in number of magnetic fields compared to number of coils is between 1 and 5.

3. The wind turbine of claim 2, wherein the number of magnetic fields defined by the magnetic annulus is greater than the number of coils in the sequence of coils.

4. The wind turbine of claim 1, wherein the number of coils in the sequence of coils is odd and wherein the number of magnetic fields defined by the magnetic annulus is even.

5. The wind turbine of claim 1, wherein the coils in the sequence of coils are substantially contiguous thereby substantially to fill a circumferential distance available to them.

6. The wind turbine of claim 1, wherein each of the plurality of turns of the coils has an outer radius and an inner radius, a difference in magnitude between the outer radius and the inner radius being equal to or less than the distance between adjacent magnetic fields.

7. The wind turbine of claim 1, wherein a spacing between individual magnetic fields, the spacing between the centers of individual coils and the geometry of the individual coils is such that turns of one side of the coils are in a first magnetic field of the plurality of magnetic fields at the same time as turns of the other side of the coils are in a magnetic field of opposite polarity of the plurality of magnetic fields adjacent to the first magnetic field.

8. The wind turbine of claim 1, wherein the magnetic annulus is comprised of a plurality of ferrite magnets.

9. The wind turbine of claim 1, wherein a spacing between individual magnetic fields and the spacing between centers of individual coils in the sequence of coils is such that electric current induced in each coil is out of phase with electric currents induced in all of the other coils in the sequence of coils.

10. The wind turbine of claim 1, wherein there is no magnetic material connecting the magnetic annuli together and wherein the coils do not require any ferromagnetic material in the coil carrying annulus for the purpose of generating significant electricity.

11. The wind turbine of claim 1, comprising a series of the coil annuli interleaving a series of the magnetic annuli wherein either (a) a relative angular placement of the coil annuli and/or magnetic annuli are such that electric currents induced in the coils of adjacent sequences of coils are substantially in phase with one another, or (b) the relative angular placement of the coil annuli and/or magnetic annuli are such that electric currents induced in the coils of adjacent sequences of coils are substantially out of phase with one another.

12. The wind turbine of claim 1, wherein the number of coils in the sequence of coils is at least 3 and wherein the number of common factors other than one between the number of coils in the sequence of coils and the number of individual magnetic fields around the common axis is zero or the number of coils in the sequence of coils is at least 9 and wherein the number of common factors other than one between the number of coils in the sequence of coils and the number of individual magnetic fields around the common axis is one or zero.

13. The turbine of claim 1, wherein a pitch of the magnetic fields is different than a pitch of the coils.

14. The turbine of claim 1, wherein a pitch of the magnetic fields is smaller than a pitch of the coils.

15. The wind turbine of claim 1, wherein the number of magnetic fields defined by the magnetic annuli is at least 10.

16. The wind turbine of claim 1, wherein the number of magnetic fields defined by the magnetic annuli is at least 50.

17. The wind turbine of claim 1, wherein a relative positioning of individual magnetic fields and a relative positioning of centers and sizing of individual coils in the sequence of coils is such that none of the electric currents in the individual coils of the sequence of coils are in phase with one another.

18. The wind turbine of claim 1, wherein the difference in number of magnetic fields compared to number of coils is between 1 and 3.

19. The wind turbine of claim 1, wherein the difference in number of magnetic fields compared to number of coils is 1.

* * * * *